(12) United States Patent
Hirota et al.

(10) Patent No.: US 11,413,791 B2
(45) Date of Patent: Aug. 16, 2022

(54) THREE-DIMENSIONAL MODELED OBJECT MADE OF METAL AND METHOD FOR MANUFACTURING THREE-DIMENSIONAL MODELED OBJECT MADE OF METAL

(71) Applicant: SODICK CO., LTD., Kanagawa (JP)

(72) Inventors: Atsushi Hirota, Kanagawa (JP); Shuji Okazaki, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 353 days.

(21) Appl. No.: 16/531,115

(22) Filed: Aug. 4, 2019

(65) Prior Publication Data
US 2020/0038956 A1 Feb. 6, 2020

(30) Foreign Application Priority Data

Aug. 6, 2018 (JP) .............. JP2018-147411

(51) Int. Cl.
B22F 3/105 (2006.01)
B22F 5/00 (2006.01)
B29C 33/10 (2006.01)
B29C 64/153 (2017.01)
B22F 7/00 (2006.01)
B22F 10/20 (2021.01)
B33Y 80/00 (2015.01)
B29C 33/00 (2006.01)
B33Y 70/00 (2020.01)
B33Y 10/00 (2015.01)

(52) U.S. Cl.
CPC .............. *B29C 33/10* (2013.01); *B22F 5/007* (2013.01); *B22F 7/002* (2013.01); *B22F 10/20* (2021.01); *B29C 33/00* (2013.01); *B29C 64/153* (2017.08); *B33Y 80/00* (2014.12); *B33Y 10/00* (2014.12); *B33Y 70/00* (2014.12)

(58) Field of Classification Search
None
See application file for complete search history.

(56) References Cited

U.S. PATENT DOCUMENTS

2008/0078920 A1* 4/2008 Takahashi ............... B29C 48/11
249/60
2014/0010908 A1 1/2014 Matsumoto et al.

FOREIGN PATENT DOCUMENTS

JP 2002249805 9/2002
JP 5776004 9/2015

OTHER PUBLICATIONS

USDA Natural Resources COnservation Service, Bulk Density, Jun. 2008 (Year: 2008).*

(Continued)

Primary Examiner — Mary I Omori
(74) Attorney, Agent, or Firm — JCIPRNET

(57) ABSTRACT

A three-dimensional modeled object made of metal including a gas flow path is provided. The gas flow path includes a first structure portion with a lattice structure including a plurality of linear vent holes with a maximum width of equal to or greater than 0.01 mm and equal to or less than 0.10 mm and a frame body portion with a width of equal to or greater than 0.08 mm and equal to or less than 0.25 mm and with a solidification density of equal to or greater than 90%, and has a thickness of equal to or greater than 1 mm and equal to or less than 10 mm.

3 Claims, 8 Drawing Sheets

(56) References Cited

OTHER PUBLICATIONS

What Causes Porosity in Metal?, J.F. Heat Treating, Mar. 1, 2018, https://jfheattreatinginc.com/2018/03/what-causes-porosity-in-metal/ (Year: 2018).*

Hironobu Fujimaru, et al., "Improvement performance of Porous Metal Mold using 3D Printer for Industry by Electron Beam Irradiation," Proceedings of Spring 2016 Academic Meeting of the Japan Society for Precision Engineering, Sep. 2016, pp. 547-548.

Ryosuke Yoshioka, et al., "Investigation of the basic characteristics of Porous Metal Mold by Laser Metal Sintering Method using industrial 3D printer," Proceedings of Spring 2016 Academic Meeting of the Japan Society for Precision Engineering, Jan. 2016, pp. 549-550.

English translation of "Office Action of Japan Counterpart Application," dated Mar. 7, 2019, p. 1-p. 3.

* cited by examiner

THREE-DIMENSIONAL MODELED OBJECT MADE OF METAL AND METHOD FOR MANUFACTURING THREE-DIMENSIONAL MODELED OBJECT MADE OF METAL

CROSS-REFERENCE TO RELATED APPLICATION

This application claims the priority benefit of Japan application serial no. 2018-147411, filed on Aug. 6, 2018. The entirety of the above-mentioned patent application is hereby incorporated by reference herein and made a part of this specification.

BACKGROUND

Technical Field

The disclosure relates to a three-dimensional modeled object made of metal and a method for manufacturing a three-dimensional modeled object made of metal. In particular, the disclosure relates to a three-dimensional modeled object made of metal that has a gas flow path with a lattice structure and a method for manufacturing the three-dimensional modeled object made of metal.

Description of Related Art

As one of methods for manufacturing a three-dimensional modeled object used in a three-dimensional modeling device for manufacturing a three-dimensional modeled object made of metal, namely a so-called metal 3D printer, a metal powder lamination modeling method for generating a three-dimensional modeled object by laminating sintered layers through repetition of uniform spreading of metal material powder to form a powder layer and irradiation of a predetermined irradiation region on the powder layer with laser light or an electron beam to melt and solidify the material powder in the predetermined region is known.

Incidentally, some three-dimensional modeled objects may require a gas flow path for distributing only gas. Specifically, a vent for discharging only gas retained in a cavity space of at least one of a core mold and a cavity mold outside of the cavity space may be provided in a resin shaping mold. Alternatively, an air intake hole for suctioning air to bring a gap between an adsorption surface and a surface of an adsorbed object into a nearly vacuum state may be provided in a vacuum chuck, for example.

According to the metal powder lamination modeling method, it is possible to form a gas flow path with a porous structure by sintering a portion corresponding to the gas flow path with a low density while setting the energy density of laser light to be relatively low, as representatively disclosed in Patent Document 1. According to the metal powder lamination modeling method as disclosed in Patent Document 1, it is possible to relatively easily produce a gas flow path through which only gas is made to be distributed.

However, since a gas flow path with a porous structure formed by sintering a material powder with laser light is generated by reducing the density of the solidified material, the strength thereof is relatively low. Also, the path through which the gas is distributed in the gas flow path with the porous structure is not linearly connected, and the amount of flow of the gas in the gas flow path may be relatively small.

Therefore, since sufficient permeability cannot be secured if the path through which the gas flows becomes long, it is not possible to enhance the strength by increasing the thickness of the porous structure portion. As a result, a three-dimensional modeled object that has a gas flow path with a porous structure formed by the sintering-type powder lamination molding method is not suitable for use as a product for which high strength and durability are required, such as a mold, for example.

Non-Patent Documents 1 and 2 disclose a modeling method for forming a portion on a gas inlet side such that it has a porous structure using the powder lamination modeling method, and forming a portion on a gas outlet side such that it has a lattice structure (grid structure), thereby reinforcing a porous structure body on the gas inlet side with a lattice structure body on the outlet side. According to a modeling method in Non-Patent Document 1 or 2, it is possible to reinforce a three-dimensional structure body while securing permeability in a gas flow path by reinforcing a porous structure body with a lattice structure body.

PATENT DOCUMENTS

[Patent Document 1] Japanese Patent No. 5776004

NON-PATENT DOCUMENTS

[Non-Patent Document 1] Proceedings of Spring 2016 Academic Meeting of the Japan Society for Precision Engineering, pp. 547 to 548, "Improvement performance of Porous Metal Mold using 3D Printer for Industry by Electron Beam Irradiation" (Hironobu Fujimaru, Hiroshi Koresawa, Hiroyuki Narahara).

[Non-Patent Document 2] Proceedings of Spring 2016 Academic Meeting of the Japan Society for Precision Engineering, pp. 549 to 550, "Investigation of the basic characteristics of Porous Metal Mold by Laser Metal Sintering Method using industrial 3D Printers", (Ryosuke Yoshioka, Hiroyuki Narahara, Hiroshi Koresawa).

It is necessary for multiple pores (hollows) to have a uniform size of equal to or greater than $0.1$ mm$\phi$ in order to secure sufficient permeability in a gas flow path with a porous structure. However, it is not easy even for a highly skilled worker to stably obtain a gas flow path with a porous structure that has multiple pores with a uniform shape and size by setting suitable conditions for irradiation with laser light.

Particularly, since a high-temperature high-pressure molding material is pushed and flows into the pores and this may lead to clogging in a case in which a three-dimensional modeled object made of metal is a resin shaping mold, for example, it may become necessary to clean the mold often, which degrades operability. In addition, if the molding material enters a deep portion of the gas flow path and then solidifies, it may become difficult to remove the molding material from the gas flow path, and it may become impossible to continuously use the gas flow path. In addition, since an inlet of the gas flow path has a porous structure and a rough surface, a surface shape of the inlet of the gas flow path may be transferred to a molded article, and this may lead to degradation of quality of the molded article.

SUMMARY

The disclosure provides a three-dimensional modeled object made of metal including a gas flow path with sufficient strength that has a plurality of vent holes with a uniform sectional shape and can sufficiently secure permeability. Also, the disclosure provides a method for manufacturing a three-dimensional modeled object made of metal that can facilitate manufacturing of a three-dimensional modeled object made of metal including a gas flow path with sufficient strength that has a plurality of vent holes with a uniform sectional shape and can sufficiently secure permeability. Several other advantages that can be achieved by the disclosure will be described in detail as needed in description of specific embodiments.

According to an embodiment, there is provided a three-dimensional modeled object made of metal including: a gas flow path that includes a structure portion with a lattice structure including a plurality of linear vent holes with a maximum width of equal to or greater than 0.01 mm and equal to or less than 0.10 mm and a frame body portion with a width of equal to or greater than 0.08 mm and equal to or less than 0.25 mm and with a solidification density of equal to or greater than 90%, a thickness of the structure portion being equal to or greater than 1 mm and equal to or less than 10 mm.

There is provided a three-dimensional modeled object made of metal including: a gas flow path that includes a first structure portion with a lattice structure including a plurality of linear vent holes with a maximum width of equal to or greater than 0.01 mm and equal to or less than 0.10 mm and a frame body portion with a width of equal to or greater than 0.08 mm and equal to or less than 0.25 mm and with a solidification density of equal to or greater than 90%, a thickness of the first structure portion being equal to or greater than 1 mm and equal to or less than 10 mm; and a second structure portion with a space dividing structure with a polygonal shape including a plurality of linear vent holes with a width that is equal to or greater than 1.5 times the maximum width of the vent holes of the first structure portion, the vent holes of the second structure portion being connected to the vent holes of the first structure portion, and a frame body portion with a sintered density, a solidification density of equal to or greater than 90%, the second structure portion being integrally coupled to the first structure portion.

In particular, the second structure portion has a tapered shape with a thickness that decreases toward a central portion of the gas flow path in the three-dimensional modeled object made of metal according to the embodiment, thereby maintaining permeability and improving strength.

According to another embodiment, there is provided a method for manufacturing a three-dimensional modeled object made of metal that has a gas flow path with a lattice structure by a metal powder lamination modeling method, the manufacturing method including: forming the gas flow path with the lattice structure including vent holes with a maximum width of equal to or greater than 0.01 mm and equal to or less than 0.10 mm by repeating irradiation with laser light while moving the laser light at a predetermined scanning speed along a scanning path of a first raster scanning line or a second raster scanning line for each of powder layers, such that when the scanning path for an N-th powder layer to be laminated is assumed to be the first raster scanning line, the scanning path for an N+1-th powder layer is set to be the second raster scanning line that perpendicularly intersects the first raster scanning line, the scanning path for an N+2-th powder layer is set to be the first raster scanning line, and the scanning path for an N+3-th powder layer is set to be the second raster scanning line, in a state in which a spot diameter of the laser light with a required output is set to be equal to or greater than 0.1 mmϕ and equal to or less than 0.2 mmϕ, the scanning path of the laser light has a raster scanning line shape, and a pitch between the raster scanning lines is set to be equal to or greater than a desired maximum width of the linear vent holes in the lattice structure.

In addition, the gas flow path with the lattice structure is assumed to be a first structure portion, and the gas flow path is formed by producing a second structure portion with a space dividing structure with a polygonal shape such that the second structure portion is integrally coupled to the first structure portion, the second structure portion having vent holes that communicate with the vent holes of the first structure portion and having a maximum width that is greater than the maximum width of the vent holes of the first structure portion.

Since the gas flow path has a lattice structure and the frame body is formed such that it has a high density in the three-dimensional modeled object according to the disclosure, the three-dimensional modeled object has sufficient strength which enables utilization as a three-dimensional modeled object that requires strength. Also, the three-dimensional structure body according to the disclosure has a gas flow path with a lattice structure that has uniform linear vent holes with superior permeability to that of a gas flow path with a porous structure. As a result, the three-dimensional modeled object according to the disclosure has a gas flow path with a sufficiently small maximum width.

Therefore, since it is more difficult for substances other than gases to enter the gas flow path, operability during maintenance of the three-dimensional modeled object is improved. Also, since it is possible to remove substances that have entered each vent hole, it is possible to extend a lifetime of the three-dimensional modeled object. In a case in which the three-dimensional structure body is a mold, in particular, since it is difficult for a configuration shape of inlets of the vent holes in the lattice structure to be transferred to a molded article, it is thus possible to maintain quality of the molded article.

According to the method for manufacturing a three-dimensional modeled object made of metal in the disclosure, a worker easily sets suitable irradiation conditions with high reproducibility, and it is possible to efficiently form linear vent holes with a uniform shape and size merely by scanning laser light and to form a lattice frame body with a high density. In addition, it is possible to manufacture a three-dimensional modeled object including a gas flow path that has excellent permeability and sufficient strength, operability of the three-dimensional modeled object made of metal is improved, and it is possible to extend a lifetime of the three-dimensional modeled object. When the three-dimensional modeled object is a mold, in particular, it is possible to maintain quality of a molded article.

DESCRIPTION OF THE EMBODIMENTS

Figure 1:
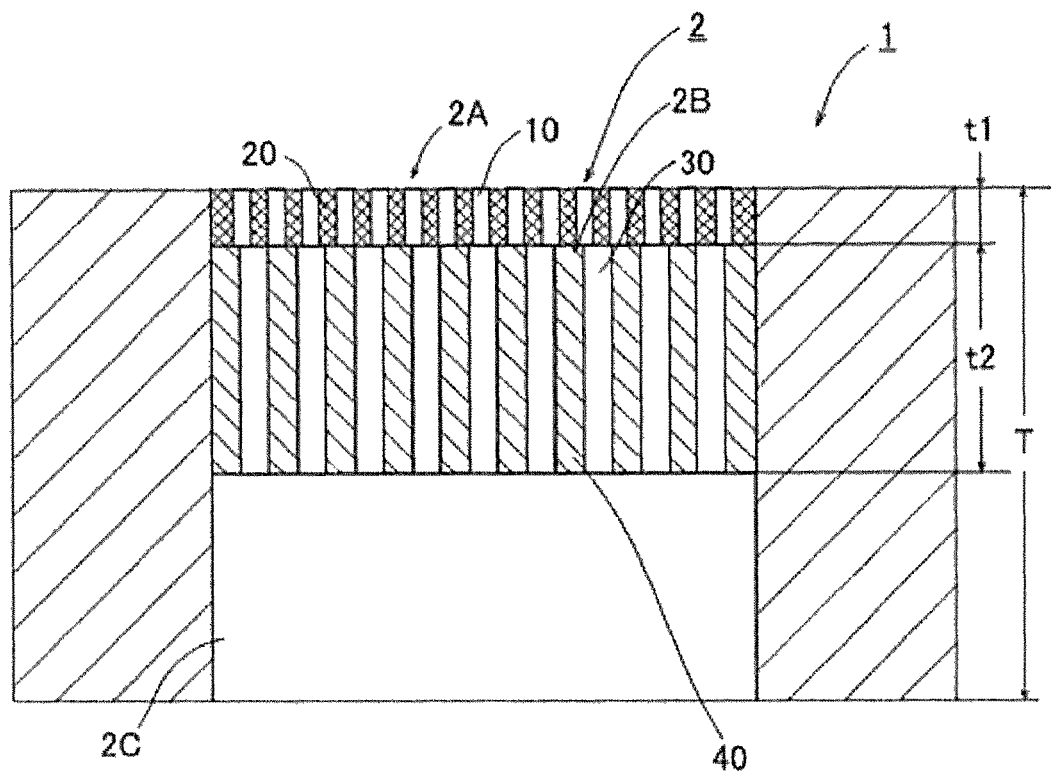
FIG. 1 is a sectional view in the vertical direction illustrating a structure of a gas flow path in a three-dimensional modeled object according to an embodiment of the disclosure.
Figure 2:
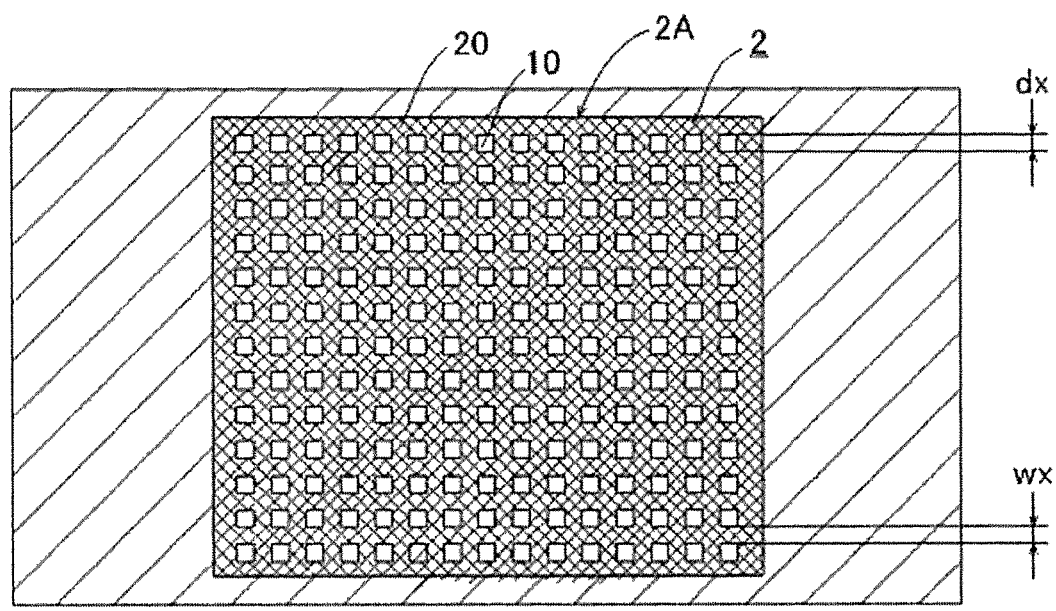
FIG. 2 is a top view illustrating the structure of the gas flow path in the three-dimensional modeled object according to the embodiment of the disclosure illustrated in FIG. 1.

FIG. 1 schematically illustrates a structure of a three-dimensional modeled object made of metal according to a representative embodiment of the disclosure. FIG. 1 partially extracts and illustrates a portion in which a gas flow path is present in the entire three-dimensional modeled object. It is assumed that even if there are portions at which the respective vent holes of a first structure portion and a second structure portion appear as if they were not connected to each other in the three-dimensional modeled object illustrated in FIG. 1, they are connected to each other when seen in another direction.

A three-dimensional modeled object 1 made of metal illustrated in FIG. 1 has a plurality of gas flow paths 2. Each gas flow path 2 includes a first structure portion 2A with a lattice structure, a second structure portion 2B with a lattice structure that is integrally coupled to the first structure portion 2A to reinforce the first structure portion 2A, and a hollow portion 2C. However, it is also possible to conceptually regard the hollow portion 2C as a simple space and regard the hollow portion 2C as being not included in the gas flow path 2. Also, in a case in which a maximum thickness T of the three-dimensional modeled object 1 is relatively thin, the hollow portion 2C may not be present.

In order for the first structure portion 2A to secure required permeability, it is necessary that the shape and the size of the vent holes 10 be uniform and the vent holes 10 be linearly provided. At this time, it is possible to theoretically state that functions of the gas flow path 2 are provided as long as each vent hole 10 has such a size that gas can pass therethrough. However, in a case of the vent holes 10 with a square sectional shape, a maximum width dx of each vent hole 10 of the gas flow path 2 is required to be equal to or greater than 0.01 mm in order for a sufficient flow amount of gas to pass through the vent hole 10 in practice. Note that since the vent holes have a wide variety of sectional shapes, the sizes of the vent holes will be represented by the maximum widths thereof in the disclosure.

Due to characteristics of melting and solidifying material powder using energy of laser light, there is a tendency for thermal energy to affect the material powder on the outer side beyond a location of the laser light and for the sizes of the vent holes 10 to become smaller than scheduled. Therefore, a lower limit value of the manufacturable maximum width dx that enables formation of the vent holes 10 with clear outline shapes while forming a frame body portion 20 with a high density that has a required strength with the powder lamination modeling method using laser light is also approximately 0.01 mm.

It is a matter of course that permeability is further improved as the maximum width dx of the vent holes 10 increases. However, if the maximum width dx of the vent holes 10 exceeds 0.10 mm, there is a high probability that substances other than gases, such as for example, even polymer compounds such as molten resin with a high density at a high temperature that has a higher viscosity than that of a gas are likely to enter the vent holes 10. Therefore, it is desirable that the maximum width dx of the vent holes 10 be equal to or less than 0.10 mm.

In a case in which the maximum width dx of the vent holes 10 is equal to or less than 0.10 mm, it is desirable that a thickness t1 of the first structure portion 2A of the gas flow path 2, in other words, a length of the linear vent holes 10 be equal to or less than 10 mm in a case in which the gas is pressurized air. At least, it has become obvious that the flow amount that meets a requirement for practical use becomes insufficient even for the pressurized air when the length of the vent holes 10 exceeds 15 mm even in a case in which the maximum width of the vent holes 10 is 0.10 mm.

However, since it is possible to increase the thickness t1 of the first structure portion 2A as compared with the maximum thickness of the gas flow path 2 with a porous structure that is formed by a similar powder lamination modeling method using laser light, the three-dimensional modeled object 1 according to the embodiment is provided.

In order for the first structure portion 2A to have a required strength, it is at least necessary that a width wx of the frame body portion 20 be greater than the maximum width dx of the vent holes 10 and the density be equal to or greater than a predetermined density. Specifically, the width wx of the frame body portion 20 is required to be about 0.08 mm when the maximum width dx of the vent holes 10 is 0.02 mm. Meanwhile, in order to provide a sufficient number of vent holes 10 for securing permeability of the entire gas flow path 2 of the first structure portion 2A, it is only necessary for the width wx of the frame body portion 20 to be equal to or less than 0.25 mm.

The density may be expressed by either a sintered density or a solidification density (bulk density), and the high density indicated in the disclosure refers to a solidification density of equal to or greater than 90%, preferably equal to or greater than 99%. Measurement of the density is performed by a method of performing image processing on a section obtained by cutting the three-dimensional modeled object and analyzing the volume of the space. Note that it is estimated that even in a case in which the density is expressed as a sintered density, a numerical value required for the high density is approximately the same numerical value as that of the solidification density.

Since the first structure portion 2A of the gas flow path 2 according to the embodiment illustrated in FIG. 1 has a lattice structure, and the vent holes 10 are provided such that the vent holes 10 penetrate linearly therethrough, it is possible to remove entering resin even if melted resin enters the vent holes 2 and thereby to extend a lifetime of the three-dimensional modeled object.

It is also possible to form the gas flow path 2 of the first structure portion 2A such that it has a honeycomb structure (regular hexagonal structure). However, it is more difficult to design the honeycomb structure as compared with the lattice structure that enables the vent holes 10 to be obtained easily by forming the frame body portion 20 along scanning paths of raster scanning lines without pausing, a manufacturing process thereof is more difficult, it takes an extra time for operations, and the honeycomb structure is thus less advantageous than the lattice structure.

In the second structure portion 2B, it is possible to further increase the maximum width of the vent holes 30 as compared with that of the vent holes 10 of the first structure portion 2A through which it is desired to cause mainly gas alone to be distributed. The second structure portion 2B is integrally coupled to the first structure portion 2A, thereby reinforcing the first structure portion 2A. The maximum width of the vent holes 30 of the second structure portion 2B have equal to or greater than 1.5 times the maximum width of the vent holes 10 of the first structure portion 2. However, there is also a case in which the maximum width of the vent holes 30 of the second structure portion 2B may be restricted in consideration of rigidity of a frame body portion 40 for maintaining the strength of the gas flow path 2.

Since it is possible to set the maximum width of the vent holes 30 of the second structure portion 2B to be greater than the maximum width dx of the vent holes 10 of the first structure portion 2A, it is possible to sufficiently increase a thickness t2 as compared with the gas portion 2A due to sufficient permeability. For example, it is possible to set the thickness t2 of the second structure portion 2B to be equal to or greater than 2 times the thickness t1 of the first structure portion 2A.

The vent holes 30 are connected to the vent holes 10 of the first structure portion 2A. The density of the frame body portion 40 is equal to or greater than 90% and is preferably equal to or greater than 99% in terms of a solidification density. Note that it is possible to increase the thickness of the second structure portion 2B as compared with the first structure portion 1A and thus to acquire strength at a lower density than that of the first structure portion 1A as long as the second structure portion 2B has a sufficient thickness.

Although it is not necessary to provide restriction regarding the width of the frame body portion 40 of the second structure portion 2B, it is desirable to align the central positions of the vent holes 30 of the second structure portion 2B to the central positions of the vent holes 10 of the first structure portion 2A in order to cause the vent holes 10 of the first structure portion 2A and the vent holes 30 of the second structure portion 2B to communicate with each other.

Since there is no practical restriction in the maximum width dx of the vent holes 10, it is possible to provide a space dividing structure with a polygonal shape other than a lattice structure to the second structure portion 2B. The space dividing structure with a polygonal shape described in the disclosure refers to a structure in which a large number of polygonal spaces are formed with frame body portions such as a lattice structure with a grid structure that is a combination of squares. Specifically, it is possible to form the second structure portion such that it has a honeycomb structure, for example.

Figure 3:
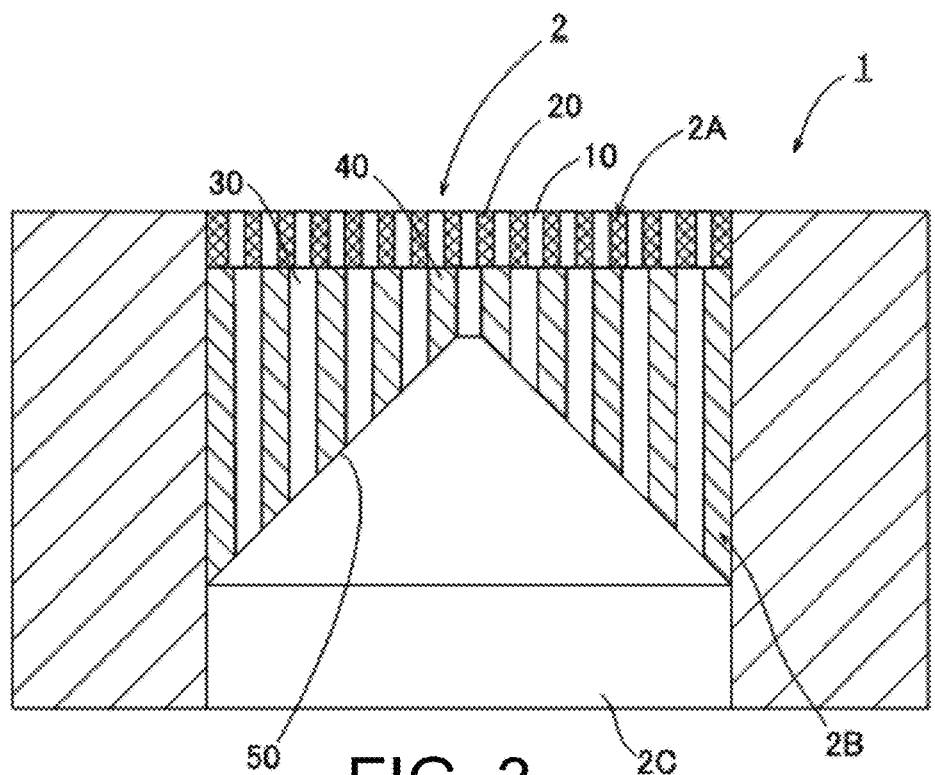
FIG. 3 is a sectional view in the vertical direction illustrating a structure of a gas flow path in a three-dimensional modeled object according to another embodiment of the disclosure.

FIG. 3 schematically illustrates a structure of a three-dimensional modeled object made of metal according to another embodiment of the disclosure. FIG. 3 partially extracts and illustrates a portion in which a gas flow path is provided in the entire three-dimensional modeled object. It is assumed that even if there are portions at which the respective vent holes of a first structure portion and a second structure portion appear as if they were not connected to each other in the three-dimensional modeled object illustrated in FIG. 3, they are connected to each other when seen in another direction.

A three-dimensional modeled object 1 made of metal 1 illustrated in FIG. 3 has a plurality of gas flow paths 2. Each gas flow path 2 has a first structure portion 2A with a lattice structure, a second structure portion 2B with a lattice structure that is integrally coupled to the first structure portion 2A to reinforce the first structure portion 2A, and a hollow portion 2C. However, it is also possible to conceptually regard the hollow portion 2C as a simple space and regard the hollow portion 2C as being not included in the gas flow path 2. Also, in a case in which a maximum thickness T of the three-dimensional modeled object 1 is relatively thin, the hollow portion 2C may not be present.

The first structure portion 2A of the gas flow path 2 according to the embodiment illustrated in FIG. 3 is substantially the same as the first structure portion 2A of the gas flow path 2 according to the embodiment illustrated in FIG. 1. Specifically, the first structure portion 2A of the gas flow path 2 has a lattice structure, a maximum width dx of a plurality of linear vent holes 10 is equal to or greater than 0.01 mm and equal to or less than 0.10 mm, a width wx of the frame body portion 20 is equal to or greater than 0.08 mm and equal to or less than 0.25 mm, a density is equal to or greater than 90% in terms of a solidification density, and a thickness t1 is equal to or greater than 1 mm and equal to or less than 10 mm.

The second structure portion 2B of the three-dimensional modeled object 1 illustrated in FIG. 3 has a tapered structure that has a tapered surface 50 with a thickness that decreases toward the central portion of the gas flow path 2. The plurality of vent holes 10 of the first structure portion 2A and the vent holes 30 of the second structure portion 2B are designed such that the vent holes 10 and the vent holes 30 are basically connected to each other and communicate with each other and the vent holes 10 of the first structure portion 2A are not completely blocked with the frame body portion 40 of the second structure portion 2B.

Since it is possible to shorten the length of the vent holes 10 and the vent holes 30 in the surroundings of the center of the entire structure of the gas flow path 2 without degrading strength, the three-dimensional structure body 1 illustrated in FIG. 3 is advantageous in terms of securing of permeability of the first structure portion 2A as a result.

Figure 4:
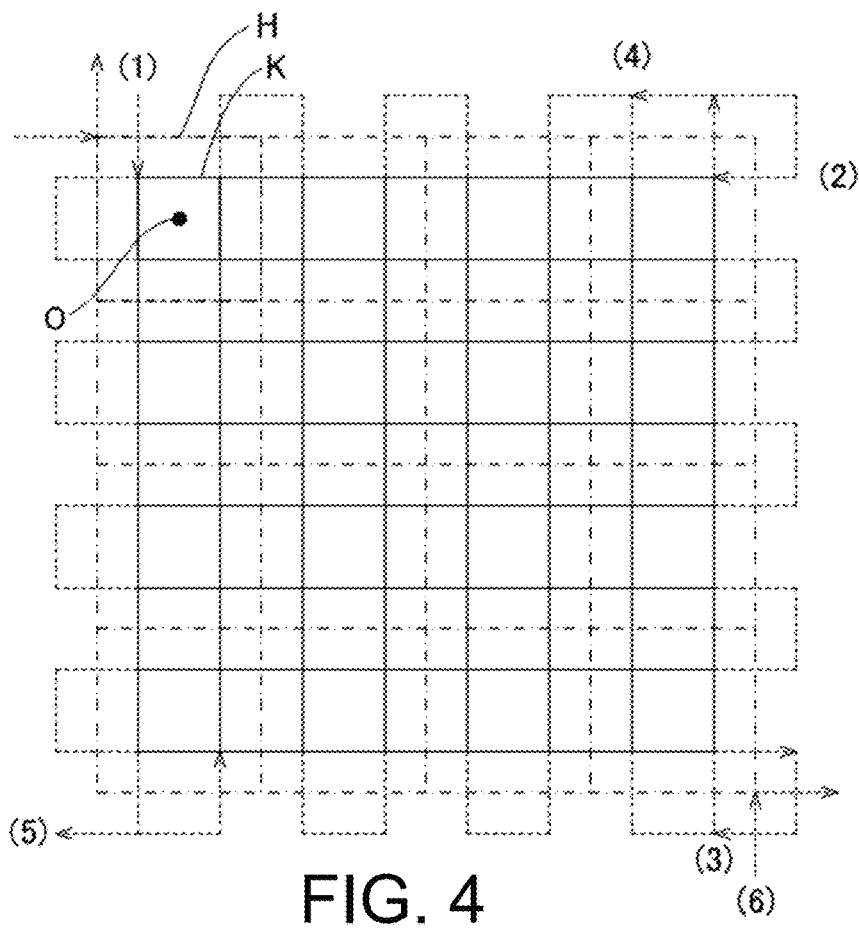
FIG. 4 is a plan view illustrating a scanning path of laser light in a method for manufacturing a three-dimensional modeled object made of metal according to the disclosure.

FIG. 4 is a diagram illustrating a scanning path of laser light according to an embodiment of a method for manufacturing a three-dimensional modeled object made of metal in the disclosure. In FIG. 4, the solid line represents a scanning path of laser light at the first structure portion, and the two-dotted dashed line represents a scanning path of laser light at the second structure portion. The dashed line including the arrows represents an approach path which is not irradiated with laser light. The numbers in the brackets represent the order in which irradiation with laser light is performed. Also, the reference numeral K represents an outline of the vent holes of the first structure portion, the reference numeral H represents an outline of the vent holes of the second structure portion, and the reference numeral O represents the centers of the vent holes.

The scanning path of laser light is a raster scanning line. If it is assumed that irradiation with the laser light from a start position to an end position of the raster scanning line is one irradiation, and that the spot diameter of the laser light is equal to or greater than 0.1 mm$\phi$ and equal to or less than 0.2 mm$\phi$, and that the width wx of the frame body portions 20 of the first structure portion 2A is equal to or greater than 0.08 mm and equal to or less than 0.25 mm, sintering of one powder layer is completed with one irradiation in principle by adjusting a scanning speed. Therefore, according to the manufacturing method of the disclosure, it is easy to set conditions of irradiation with laser light, and it is possible to form a grid frame body with a high density and to efficiently form the vent holes merely by performing irradiation with the laser light along the scanning path of the raster scanning line.

In a case in which it is attempted to form and produce a gas flow path with a lattice structure with a thickness of 5 mm that has vent holes with a maximum width of equal to or less than 0.10 mm from a carbon steel plate, it is significantly difficult to perform operations according to cutting working. According to electrical discharge working, it is possible to form the vent holes 10 in a flat surface while it takes a significantly long time. Moreover, even in the case of electrical discharge machining, it may be more difficult or substantially impossible to form vent holes depending on a disposition of the gas flow path in the three-dimensional modeled object. According to the manufacturing method of the embodiment, it is possible to more easily obtain a gas flow path with a lattice structure as compared with metal working such as cutting working or electrical discharge working.

When the maximum width dx of the vent holes 10 is equal to or less than 0.10 mm, a significantly large number of vent holes 10 with a uniform shape are required in order to secure permeability of the entire gas flow path 2. In a case in which the gas flow path 2 is created by melting and solidifying material powder through irradiation with laser light, it is desirable to reduce the spot diameter as much as possible in consideration of an energy density required for forming the frame body portion 20 with a density that is as high as 99% in terms of a solidification density to obtain strength while maintaining an outline shape of the vent holes 10. For example, it has been confirmed that a lower limit of the spot diameter of the laser light with which it is possible to stably and repeatedly obtain satisfactory results is 0.1 mmφ at present in a case of fiber laser, for example.

Although it is possible to increase the density and thus the strength as the energy of the laser light is made to increase, there is a relation that it becomes more difficult to maintain the outline of the vent holes 10 due to spreading of an extra hardened portion to the outer side of the frame body portion 20 as the energy of the laser light increases when it is attempted to form the frame body portion 20 such that it has a high density while maintaining the outline of the vent holes 10 through one irradiation with laser light along the raster scanning line since the maximum width dx of the vent holes 10 is as significantly small as 0.10 mm or less.

As illustrated in Table 1, since an interval of two parallel linear irradiation trajectories is calculated as 0 mm when the spot diameter of the laser light is 0.2 mmφ and the pitch between raster scanning lines is 0.2 mm for Sample 1, no vent holes 10 are basically formed. However, it has been confirmed that vent holes with an average maximum width dx is 0.08 mm are substantially uniformly formed if the scanning speed is set to 2000 m/sec, which is relatively a high speed, and the laser light is scanned. Note that although the test results also include portions that are not formed as holes, all formed portions including such portions will also collectively be referred to as "holes".

TABLE 1

| Sample No. | Spot diameter | Pitch | Grid width | Hole maximum width | Output | Speed | Permeability | Shape |
|---|---|---|---|---|---|---|---|---|
| Sample 1 | 0.2 mmφ | 0.20 mm | 0.08 mm | 0.08 mm | 420 W | 2000 mm/sec | ◎ | ○ |
| Sample 2 | 0.2 mmφ | 0.30 mm | — | — | 420 W | 2000 mm/sec | ○ | ○ |
| Sample 3 | 0.2 mmφ | 0.40 mm | — | — | 420 W | 2000 mm/sec | ○ | ○ |
| Sample 4 | 0.1 mmφ | 0.20 mm | — | — | 420 W | 2000 mm/sec | ◎ | Δ |
| Sample 5 | 0.1 mmφ | 0.30 mm | — | — | 420 W | 2000 mm/sec | ○ | Δ |
| Sample 6 | 0.1 mmφ | 0.40 mm | — | — | 420 W | 2000 mm/sec | ○ | X |

Permeability: ◎: Good, ○: Permeability is observed, X: No permeability is observed
Shape: ○: Enough, Δ: Not enough, X: bad Since the width wx of the frame body portion 20 increases if the spot diameter is set to be greater than 0.2 mmφ, the number of vent holes 10 that can be produced decreases, and it becomes difficult to secure permeability. Also, there is a probability that an extra hardened portion generated at outlines of the vent holes 10 further increases for each sintered layer, it becomes difficult to obtain the outline shape of the vent holes 10, and the vent holes 10 are blocked at midpoints. Therefore, it is basically necessary to set the spot diameter to be equal to or less than 0.2 mmφ.

In Table 1, the maximum widths dx of the vent holes 10 and the grid widths wx of the frame body portions 20 in Samples 2 to 6 are not actually measured, and only permeability is checked by supplying a predetermined amount of compressed air. However, since the maximum width dx of the vent holes 10 and the width wx of the frame body portion 20 in Sample 1 in which the pitch interval between raster scanning lines is 0 mm are measured, and permeability is checked from the degree of distribution of the compressed air, it is possible to estimate that the vent holes 10 with the maximum width dx that is greater than the maximum width dx of the vent holes 10 in Sample 1 are formed in calculation.

Figure 5:
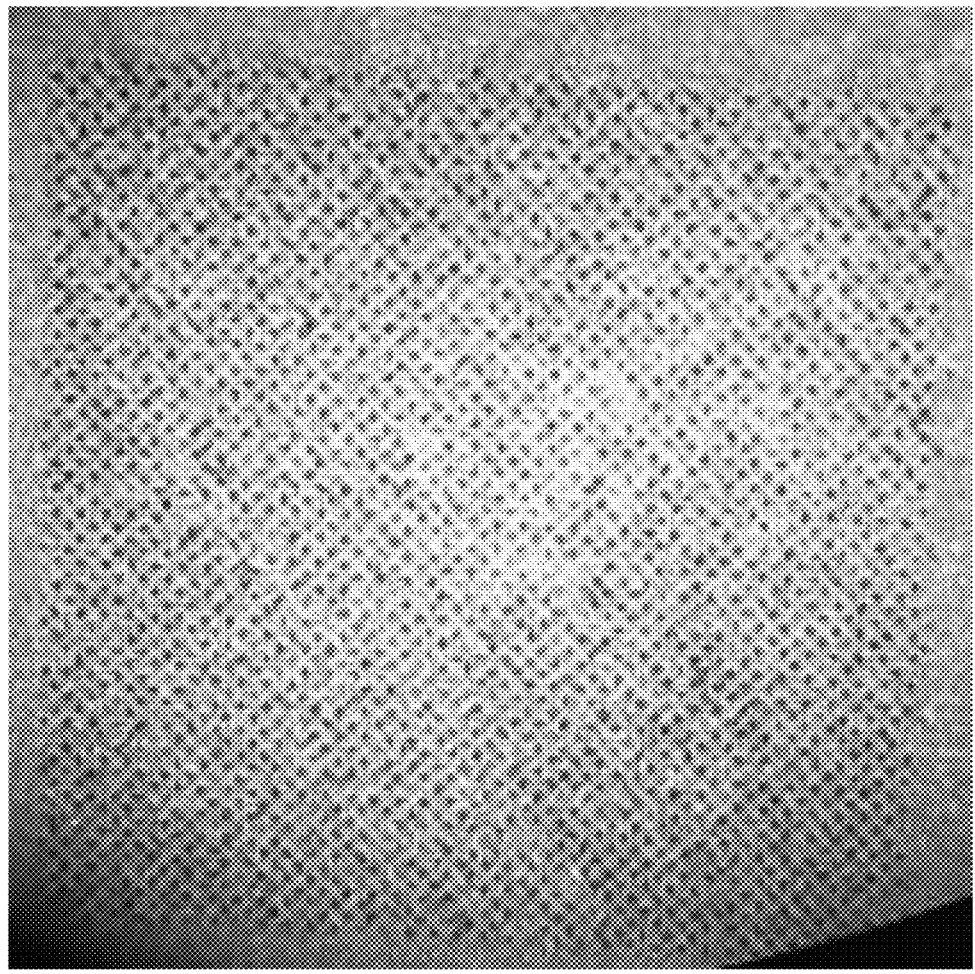
FIG. 5 is an image of a section of a sample in a horizontal direction illustrating a result of trial working.
Figure 6:
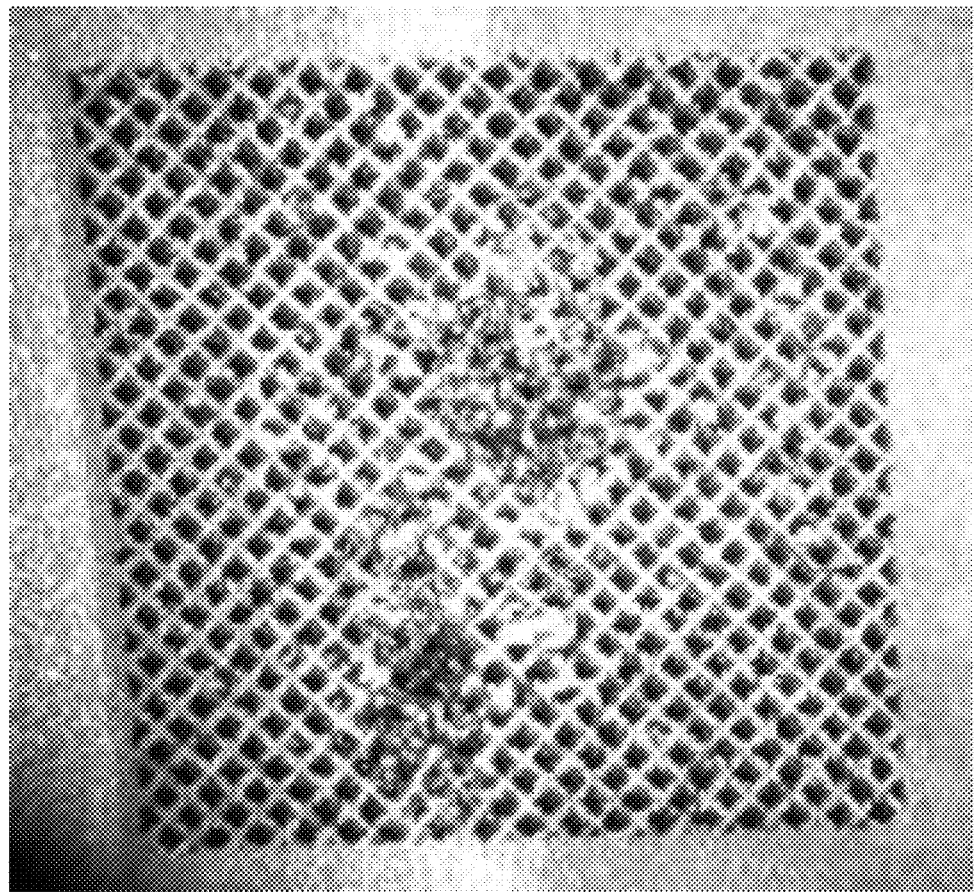
FIG. 6 is an image of a section of a sample in the horizontal direction illustrating another result of trial working.

In a case in which the spot diameter of the laser light is 0.1 mmφ, the scanning speed is excessively high, the density of the frame body portion 20 decreases, and it is not possible to obtain the vent holes 10 with a uniform outline shape. A photograph of a horizontal cut surface of Sample 1 that exhibits the most satisfactory permeability of compressed air and outline shape is illustrated in FIG. 5. Also, a photograph of a horizontal cut surface of Sample 6 that exhibits the poorest permeability of compressed air is illustrated in FIG. 6.

As illustrated in Table 2, although the extra hardened portion spreads, opening areas of the vent holes 10 become narrow, and permeability deteriorates in a case in which the scanning speed of 1400 mm/sec is set to fall within an intermediate speed region, the density of the frame body portion 20 increases, the strength increases, and it possible to obtain a more uniform outline shape of the vent holes 10 since a heating time for each predetermined distance becomes longer than that when the scanning speed is 2000 mm/sec.

TABLE 2

| Sample No. | Spot diameter | Pitch | Grid width | Hole maximum width | Output | Speed | Permeability | Shape |
|---|---|---|---|---|---|---|---|---|
| Sample 11 | 0.2 mmφ | 0.10 mm | — | — | 420 W | 1400 mm/sec | X | X |
| Sample 12 | 0.2 mmφ | 0.12 mm | — | 0.02 mm | 420 W | 1400 mm/sec | X | X |
| Sample 13 | 0.2 mmφ | 0.14 mm | — | 0.04 mm | 420 W | 1400 mm/sec | X | X |
| Sample 14 | 0.2 mmφ | 0.16 mm | — | 0.06 mm | 420 W | 1400 mm/sec | X | X |
| Sample 15 | 0.2 mmφ | 0.18 mm | — | 0.08 mm | 420 W | 1400 mm/sec | Δ | ○ |
| Sample 16 | 0.2 mmφ | 0.20 mm | — | 0.10 mm | 420 W | 1400 mm/sec | ○ | ◎ |

Permeability: ○: Good, Δ: Not good, X: No permeability is observed
Shape and rigidity: ◎: Uniform hole shape, ○: Holes substantially penetrate, X: Defective holes or no holes are observed If the scanning speed is 1400 mm/sec, and the pitch between the raster scanning lines is reduced, the vent holes 10 are filled, and the outline shape collapses due to spreading of the extra hardened portion. In a case of Sample 11 in Table 2, for example, substantially no vent holes 10 are formed.

Figure 7:
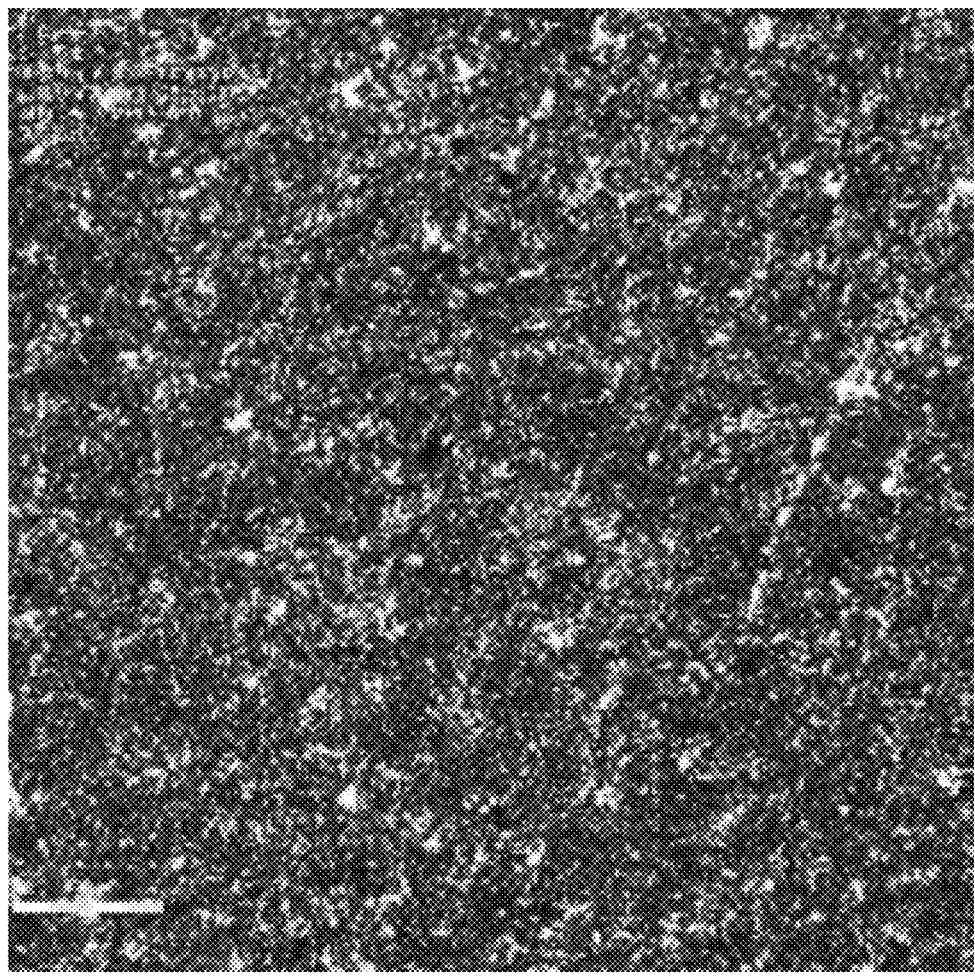
FIG. 7 is an image of a section of a sample in the horizontal direction illustrating another result of trial working.
Figure 8:
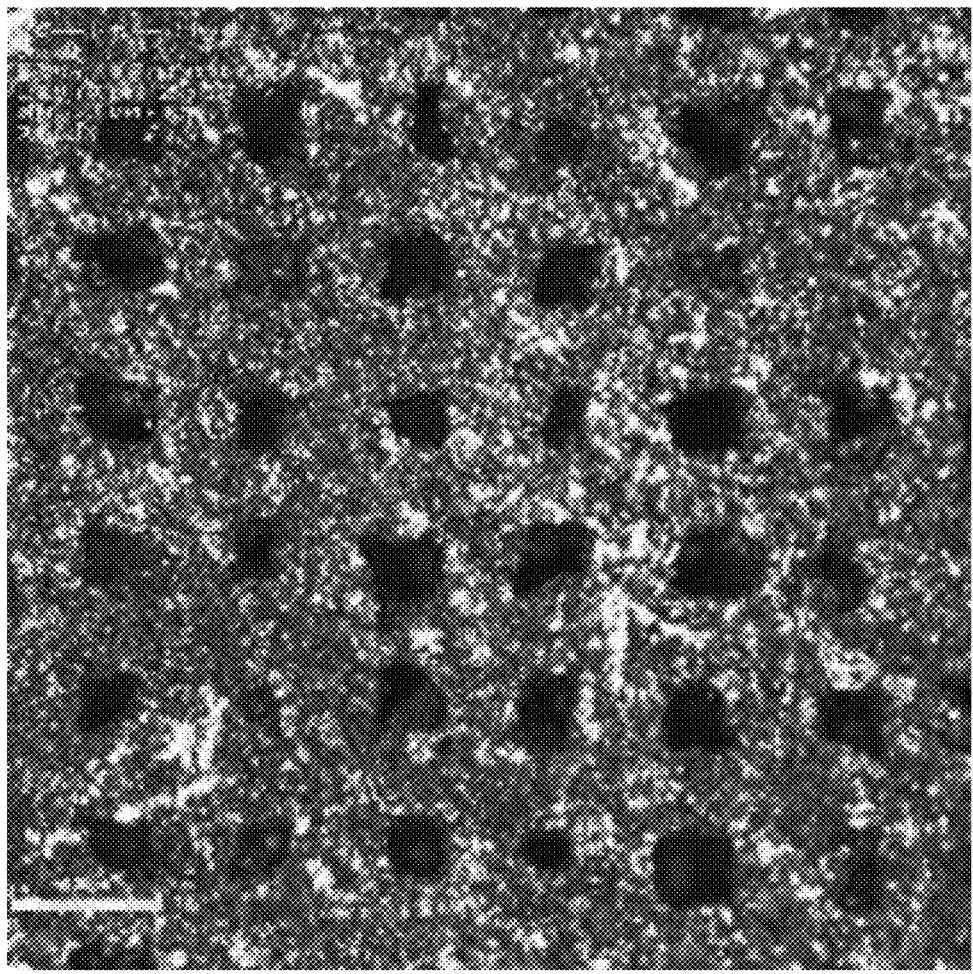
FIG. 8 is an image of a section of a sample in the horizontal direction illustrating another result of trial working.

In conclusion, it is not possible to obtain the outline shape of the vent holes 10 without further increasing the pitch between the raster scanning lines in a case in which the scanning speed falls in the intermediate speed region, and if the pitch is set to be larger, the maximum width dx of the vent holes 10 has to increase. A photograph of a horizontal cut surface of Sample 11 in which the vent holes 10 was desired to be formed is illustrated in FIG. 7, and a photograph of a horizontal cut surface of Sample 16 that exhibits relatively satisfactory permeability and outline shape of the vent holes 10 is illustrated in FIG. 8. Note that the photographs in FIGS. 7 and 8 are enlarged photographs obtained using a laser microscope at a magnification of 10 folds.

Next, the spot diameter is set to 0.1 mmφ, the maximum width dx of the frame body portion 20 is narrowed as much as possible, the pitch is further extended in consideration of the spreading of the extra hardened portion, the scanning speed is reduced in a stepwise manner, and permeability and the outline shape of the vent holes 10 are checked.

Figure 9:
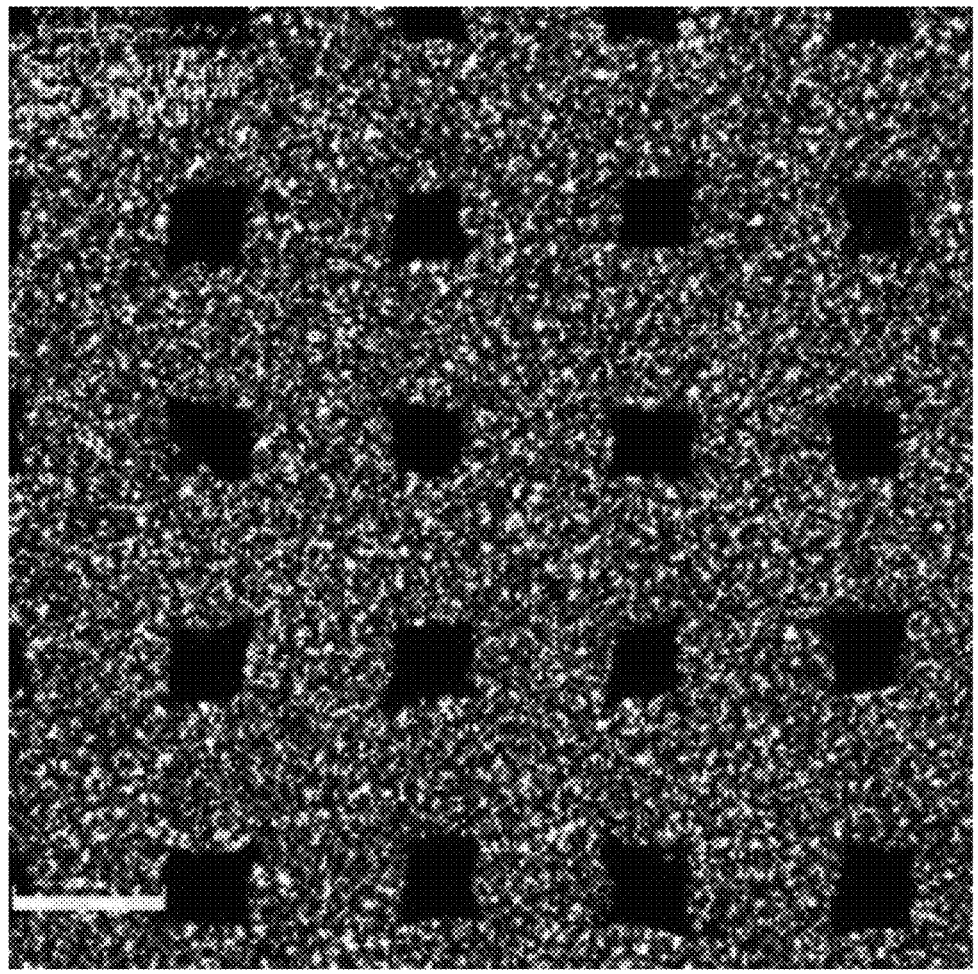
FIG. 9 is an image of a section of a sample in the horizontal direction illustrating another result of trial working.

As illustrated in Table 3, when the scanning speed is 600 mm/sec, the maximum width dx of the frame body portion 20 relatively increases, while the extra hardened portion is not significantly enlarged, and it is possible to further reduce the maximum width dx of the vent holes 10 and to obtain a uniform and stable outline shape. A photograph of a horizontal cut surface of Sample 26 obtained at a scanning speed of 600 mm/sec is illustrated in FIG. 9. Note that the photograph in FIG. 9 is an enlarged photograph obtained using a laser microscope at a magnitude of 10 folds.

TABLE 3

| Sample No. | Spot diameter | Pitch | Grid width | Hole maximum width | Output | Speed | Permeability | Shape |
|---|---|---|---|---|---|---|---|---|
| Sample 21 | 0.1 mmφ | 0.30 mm | 0.10 mm | 0.20 mm | 370 W | 1600 mm/sec | — | X |
| Sample 22 | 0.1 mmφ | 0.30 mm | 0.14 mm | 0.16 mm | 370 W | 1400 mm/sec | — | X |
| Sample 23 | 0.1 mmφ | 0.30 mm | 0.14 mm | 0.16 mm | 370 W | 1200 mm/sec | — | X |
| Sample 24 | 0.1 mmφ | 0.30 mm | 0.14 mm | 0.16 mm | 370 W | 1000 mm/sec | — | X |
| Sample 25 | 0.1 mmφ | 0.30 mm | 0.17 mm | 0.13 mm | 370 W | 800 mm/sec | — | Δ |
| Sample 26 | 0.1 mmφ | 0.30 mm | 0.20 mm | 0.10 mm | 370 W | 600 mm/sec | — | ○ |

Figure 10:
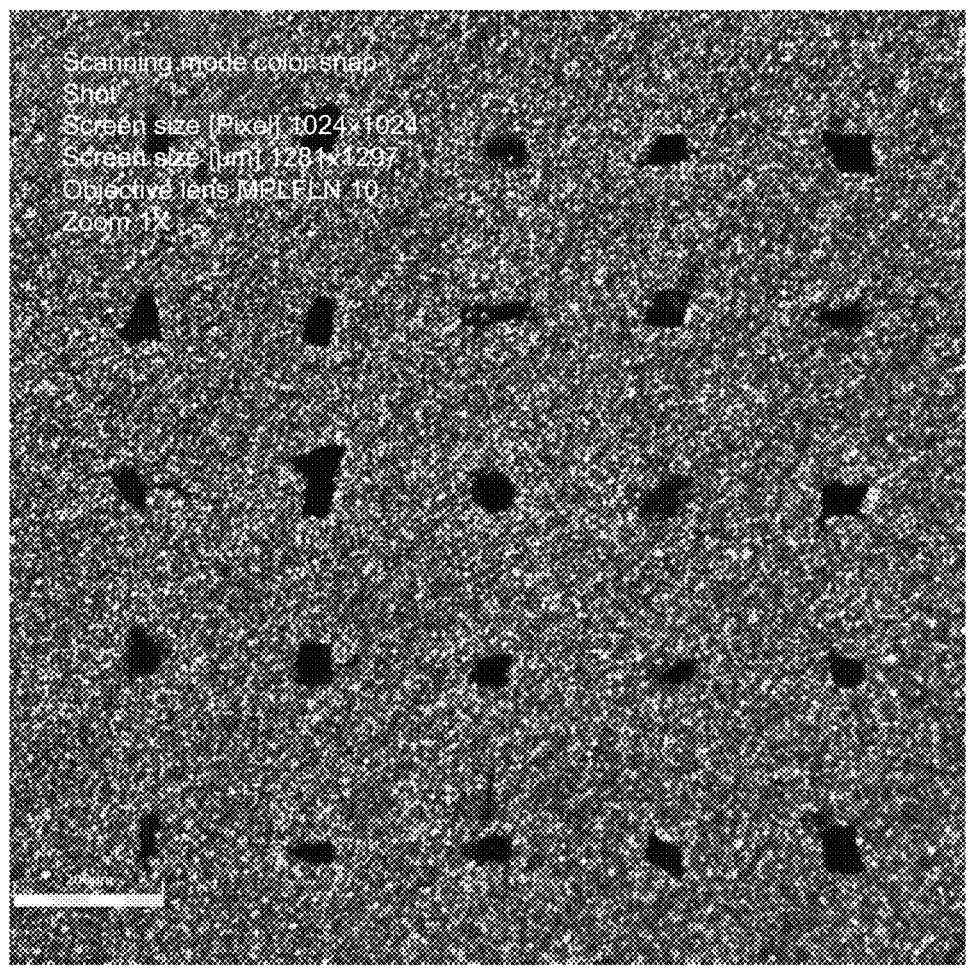
FIG. 10 is an image of a section of a sample in the horizontal direction illustrating another result of trial working.

Permeability: ○: Enough, Δ: Not enough, X: No permeability is observed
Shape: ○: Uniform, Δ: Grids have partially collapsed, X: Grids have entirely collapsed As illustrated in Table 4, it is confirmed that it is possible to reduce the maximum width dx of the vent holes 10 with sufficient permeability up to 41 μm in a case in which an output is set to 370 W, the scanning speed is set to 600 mm/sec, the spot diameter is set to 0.1 mmφ, and the pitch is gradually reduced by 0.10 mm. A photograph of a horizontal cut surface of Sample 35 when the maximum width dx of the vent holes 10 is 41 μm is illustrated in FIG. 10. Note that the photograph in FIG. 10 is an enlarged photograph obtained using a laser microscope at a magnitude of 10 folds.

TABLE 4

| Sample No. | Spot diameter | Pitch | Grid width | Hole maximum width | Output | Speed | Permeability | Shape |
|---|---|---|---|---|---|---|---|---|
| Sample 31 | 0.1 mmφ | 0.26 mm | — | 0.063 mm | 370 W | 600 mm/sec | ○ | ○ |
| Sample 32 | 0.1 mmφ | 0.25 mm | — | 0.058 mm | 370 W | 600 mm/sec | ○ | ○ |
| Sample 33 | 0.1 mmφ | 0.24 mm | — | 0.045 mm | 370 W | 600 mm/sec | ○ | ○ |
| Sample 34 | 0.1 mmφ | 0.23 mm | — | 0.041 mm | 370 W | 600 mm/sec | ○ | ○ |
| Sample 35 | 0.1 mmφ | 0.22 mm | — | 0.030 mm | 370 W | 600 mm/sec | Δ | Δ |
| Sample 36 | 0.1 mmφ | 0.21 mm | — | 0.028 mm | 370 W | 600 mm/sec | X | X |

Permeability: ○: Enough, Δ: Not enough, X: No permeability is observed
Shape: ○: Holes penetrate, Δ: Some blocked holes are observed, X: Substantially all the holes are blocked In the manufacturing method according to the disclosure, the output of the laser light is basically set to be equal to or greater than 350 W, the spot diameter is set to be equal to or greater than 0.1 mmφ and equal to or less than 0.2 mmφ, the scanning path of the laser light is set to have a raster scanning line shape, and the pitch between the raster scanning lines is set to be equal to or greater than the maximum width dx of the vent holes 10, thereby forming the gas flow path 2 with a lattice structure in which the maximum width of the vent holes 10 is equal to or greater than 0.03 mm and equal to or less than 0.10 mm. As a result, it is possible to form the frame body portion 20 with a high density through one irradiation with the laser light that follows the scanning path of the raster scanning lines and to obtain the vent holes 10 with sufficient permeability and a satisfactory outline shape.

When the spot diameter is as small as 0.1 mmφ, in particular, it is desirable that the predetermined scanning speed of the laser light fall within a low speed region of equal to or greater than about 600 mm/sec and equal to or less than about 800 mm/sec. When the spot diameter is as large as 0.2 mmφ, it is desirable that the predetermined scanning speed fall within an intermediate speed region of equal to or greater than about 1000 mm/sec and equal to or less than about 1400 mm/sec. However, since a suitable scanning speed is relatively determined in accordance with a relationships with parameters such as irradiation energy and material types, it does not mean that the disclosure cannot be performed at the scanning speed in the high-speed region, and also, it does not mean that the scanning speed is limited to a specific numerical range in the disclosure.

In addition, irradiation with the laser light is repeated while the laser light is moved at a predetermined scanning speed along each scanning path for each powder layer such that when a scanning path of an N-th powder layer to be laminated is assumed to be a first raster scanning line, a scanning path of an N+1-th powder layer is set to be a second raster scanning line that perpendicularly intersects the first raster scanning line, a scanning path of an N+2-th layer is set to be the first raster scanning line, and a scanning path of an N+3-th powder layer is set to be the second raster scanning line in a state in which the pitch between the raster scanning lines is set to be sufficiently larger than a desired maximum width dx of the vent holes 10.

In a case in which the frame body portion 20 of the first structure portion 2A does not have necessary rigidity, and the strength of the gas flow path 2 is insufficient, the second structure portion 2B with a lattice structure or a honeycomb structure that has the vent holes 30 that communicates with the vent holes 10 of the first structure portion 2A and has the maximum width that is greater than the maximum width of the vent holes 10 of the first structure portion 2A is produced such that the second structure portion 2B is integrally coupled to the first structure portion 2A, thereby enabling reinforcing of the first structure portion 2A with the second structure portion 2B.

At this time, in a case in which the second structure portion 2B has a space dividing structure with a polygonal shape, a so-called "undersintered" state in which the first structure portion 2A is formed such that the hollow portion of the first structure portion 2B is bridged is achieved.

In order to prevent the vent holes 10 of the first structure portion 2A with a small maximum width dx from being blocked in the undersintered state, it is desirable to set the raster scanning lines of the second structure portion 2B such that the centers of the vent holes 30 created along the raster scanning lines of the second structure portion 2B at a larger pitch than that of the raster scanning lines of the first structure portion 2A conform to the centers 0 of the vent holes 10 formed along the raster scanning lines of the first structure portion 2A as illustrated in FIG. 4.

However, in a case in which it is not possible to set the raster scanning lines of the first structure portion 2A and the raster scanning lines of the second structure portion such that the centers of the vent holes 10 and the vent holes 30 conform to each other, in other words, even in a case in which central axis lines between the raster scanning lines of the first structure portion 2A deviate from the central axis lines between the raster scanning lines of the second structure portion 2B, it is possible to form the gas flow path 2 while securing permeability by forming the second structure portion 2B such that it has a tapered shape with a thickness that decreases toward the central portion of the gas flow path 2.

As already described above, since the maximum width of the vent holes 30 of the second structure portion 2B and the width of the frame body portion 40 can be set to be larger than the maximum width dx of the vent holes 10 of the first structure portion 2A and the width wx of the frame body portion 20, it is possible to cause the second structure portion 2B to have a space dividing structure with a polygonal shape other than a lattice structure in a range without significantly degrading permeability.

In a case in which the second structure portion 2B is formed such that it has a honeycomb structure body, it is possible to further increase the strength as compared with a lattice structure body and thereby to further increase the maximum width of the vent holes of the gas flow path 2. The scanning path for producing the honeycomb structure body is not limited to the raster scanning line shape and can be arbitrarily set.

The disclosure is not limited to the embodiments described above and can be modified in various ways without departing from the technical idea of the disclosure although some examples have already been described. For example, the second structure portion can be formed such that it has a truss structure (triangular structure) or an isogrid structure (regular triangular structure) as the space dividing structure with a polygonal shape other than the lattice structure body.

The disclosure can be used for manufacturing a three-dimensional modeled object made of metal by a metal powder lamination modeling method. In particular, the disclosure contributes to development of mold industries and metal part industries.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A three-dimensional modeled object made of metal comprising:
   a gas flow path that comprises a first structure portion with a lattice structure comprising a plurality of linear vent holes with a maximum width of equal to or greater than 0.01 mm and equal to or less than 0.10 mm and a frame body portion with a width of equal to or greater than 0.08 mm and equal to or less than 0.25 mm and with a ratio of volume of the metal in the three-dimensional modeled object to a total volume of the three-dimensional modeled object of equal to or greater than 90%, a thickness of the first structure portion being equal to or greater than 1 mm and equal to or less than 10 mm; and a second structure portion with a space dividing structure with a polygonal shape comprising a plurality of linear vent holes with a width that is equal to or greater than 1.5 times the maximum width of the plurality of linear vent holes of the first structure portion, the plurality of linear vent holes of the second structure portion being connected to the plurality of linear vent holes of the first structure portion, and a frame body portion with a ratio of volume of the metal in the three-dimensional modeled object to the total volume of the three-dimensional modeled object of equal to or greater than 90%, the second structure portion being integrally coupled to the first structure portion,
   wherein the second structure portion has a tapered shape with a thickness that decreases toward a central portion of the gas flow path.

2. A method for manufacturing the three-dimensional modeled object made of metal according to claim 1 that has the gas flow path with the lattice structure made by a metal powder lamination modeling method, the method comprising:
   forming the gas flow path with the lattice structure comprising linear vent holes with the maximum width of equal to or greater than 0.01 mm and equal to or less than 0.10 mm by repeating irradiation with laser light while moving the laser light at a predetermined scanning speed along a scanning path of a first raster scanning line or a second raster scanning line for each of powder layers, such that when the scanning path for an N-th powder layer to be laminated is assumed to be the first raster scanning line, the scanning path for an N+1-th powder layer s set to be the second raster scanning line that perpendicularly intersects the first raster scanning line, the scanning path for an N+2-th powder layer is set to be the first raster scanning line, and the scanning path for an N+3-th powder layer is set to be the second raster scanning line, in a state in which a spot diameter of the laser light with a required output is set to be equal to or greater than 0.1 mmϕ and equal to or less than 0.2 mmϕ, the scanning path of the laser light has a raster scanning line shape, and a pitch between the raster scanning lines is set to be equal to or greater than the maximum width of the linear vent holes in the lattice structure.

3. The method for manufacturing a three-dimensional modeled object made of metal according to claim 2, wherein the gas flow path with the lattice structure is assumed to be the first structure portion, and the gas flow path is formed by producing the second structure portion with the space dividing structure with the polygonal shape such that the second structure portion is integrally coupled to the first structure portion, the second structure portion having vent holes that communicate with the linear vent holes of the first structure portion and having the maximum width that is greater than the maximum width of the linear vent holes of the first structure portion.

* * * * *